June 15, 1948.    W. ERNST    2,443,345
PRESS CONTROL SYSTEM
Filed Aug. 22, 1942    2 Sheets-Sheet 2

INVENTOR
WALTER ERNST
BY
Toulmin & Toulmin
ATTORNEYS

Patented June 15, 1948

2,443,345

UNITED STATES PATENT OFFICE 2,443,345

PRESS CONTROL SYSTEM

Walter Ernst, Mount Gilead, Ohio, assignor to H-P-M Development Corporation, a corporation of Delaware Application August 22, 1942, Serial No. 455,973

2 Claims. (Cl. 103—38)

This invention relates to control systems and, in particular, to control systems for hydraulic presses, in which the pressure fluid source for supplying fluid pressure to the press ram has associated therewith means for varying the delivery of said fluid source.

With presses of this type, it is common practice to use a variable delivery pump for supplying fluid pressure to the press ram and to control the delivery of the pump by servomotor means which, in its turn, is controlled by a solenoid actuated link system. Arrangements of this type have the drawback that the solenoid actuated link system is operated with a shock or slam action, thereby causing not only relatively great wear of the moving elements pertaining to the servomotor means and said link system, but sometimes even causing breakage of these elements.

It is, therefore, an object of the invention to provide an improved control system which will overcome the above mentioned drawback.

It is another object to provide a control system for hydraulic presses, in which the supply of fluid pressure to the press ram is controlled by fluid operable means.

A further object of the invention consists in the provision of a control system for hydraulic presses comprising a pressure fluid source of variable delivery, in which the fluid source has associated therewith control means operable hydraulically so as selectively to bring about increased or reduced delivery of said fluid source or to stop the delivery of actuating fluid from said fluid source to the press cylinder altogether.

It is still another object to provide a control system including a variable delivery pump and servomotor means associated therewith for controlling the delivery of said pump, in which fluid operable means is provided for controlling said servomotor means so as selectively to place said pump into position for advancing the press ram or for stopping the said ram.

It is still another object of the invention to provide a control system for hydraulic presses, in which the spring heretofore used in connection with reversible variable delivery pumps for placing these pumps on retraction stroke may be omitted.

These and other objects and advantages of the invention will appear more clearly from the following specification in connection with the accompanying drawings, in which.

General arrangement

In general, the control system according to the invention comprises a plurality of hydraulically operable plungers which are connected by linkage means to servomotor means pertaining to a variable delivery pump.

Valve means associated with the control system is adapted to control the flow of fluid to and from the said hydraulically operable plungers in such a manner that these plungers shift the said linkage means selectively for actuating said servomotor means so as to bring about movement of the variable delivery pump into full stroke forward or full stroke retracting position.

The said valve means may also be operated so as to bring about movement of said pump selectively into reduced delivery position or into neutral or substantially no delivery position.

Structural arrangement

Figure 1:
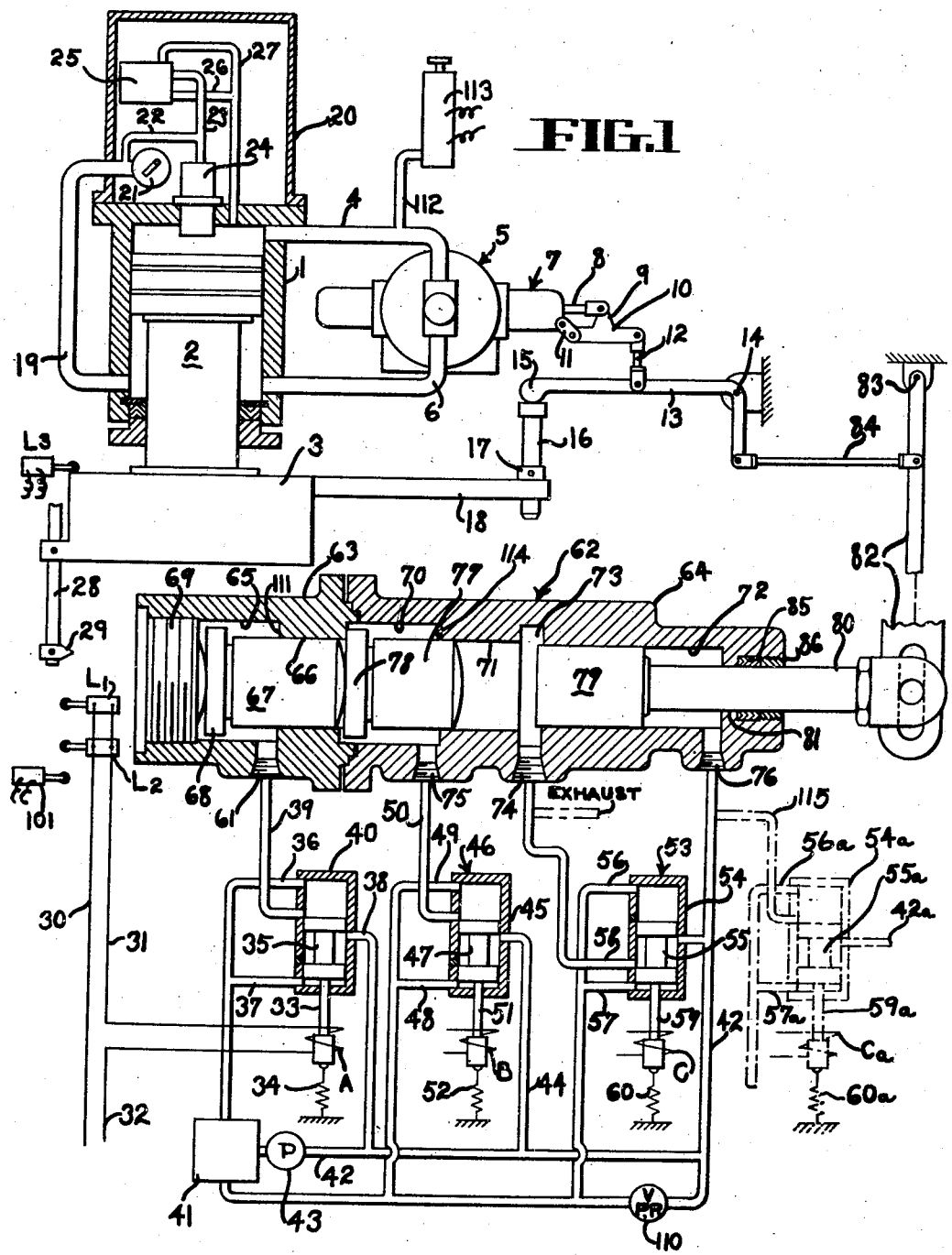
Figure 1 illustrates the control system according to the invention in connection with a hydraulic press.

Referring now to the drawings in detail, the structure shown in Figure 1 comprises a press cylinder 1 having reciprocably mounted therein a press ram 2 which has connected thereto a press platen 3.

Connected with the upper part of the press cylinder 1 is a conduit 4 leading to one side of a reversible variable delivery pump 5, the other side of which is connected by means of a conduit 6 to the lower part of the press cylinder 1. The pump 5 may be of any standard design, having servomotor means 7 associated therewith, which is adapted to control the delivery of the pump 5. Such servomotors are well known in the art and may, for instance, be of the type disclosed in the Ernst Patent No. 2,184,665.

The servomotor means 7 comprises a control rod 8 which is pivotally connected to an arm 9 of a three arm lever, generally designated 10. Another arm of the three arm lever 10 is pivotally connected by a link 11 with the casing of the servomotor means 7, while the third arm of the three arm lever 10 is pivotally connected with a link 12 which, in its turn, is pivoted to a bell crank lever 13. The lever 13 is adapted to shift about a pivot 14 and has a free end 15 adapted to be actuated by a push rod 16. The push rod 16 has adjustably connected thereto a collar 17 adapted to be engaged by an arm 18 carried by the press platen 3.

Also connected with the lower end of the press cylinder 1 is a conduit 19 leading into a tank or fluid reservoir 20 arranged on top of the cylinder 1. The conduit 19 communicates with a check valve 21 adapted to allow fluid in the tank 20 to flow therethrough into the conduit 19, while preventing the flow of fluid in the reverse direction.

Connected with the conduit 19 is a conduit 22 leading to a conduit 23, one end of which communicates with the surge valve 24, while the other end leads to a main cylinder relief and pump by-pass valve 25. The latter also communicates through conduits 26 and 27 with the upper portion of the press cylinder 1.

The surge valve 24 serves for prefilling the press cylinder 1 when the ram 2 moves downwardly by gravity, while the valve 25 is adapted to release fluid pressure from the upper portion of the press cylinder 1 at the time the retraction stroke of the ram 2 is initiated, thereby facilitating and speeding up the reversal of the ram 2. The surge valve 24 and valve 25 do not form a part of the present invention and for a more detailed description thereof, reference may respectively be had to U. S. Patent No. 2,193,248 and No. 2,268,205 both to Ernst.

The press platen 3 carries a control rod 28 having adjustably mounted thereon a cam 29 for cooperation with the limit switches L1 and L2. The arrangement is such that when the cam 29 engages either of these switches, it closes an energizing circuit for a solenoid A through the main supply line 30, line 31, solenoid A and main supply line 32. Energization of the solenoid A causes downward movement of a valve rod 33, the lower end of which is connected to one end of a tension spring 34, while the other end of the tension spring is connected to a stationary point.

The upper end of the valve rod 33 has connected thereto a valve member 35 controlling the flow of fluid through conduits 36, 37, 38 and 39, which are connected to the valve casing 40. The conduits 36 and 37, which are connected with each other, are in hydraulic communication with a tank 41, which may either be separate from the tank 20 or may form a part thereof. The conduit 38 leads to a pressure line 42 connected to the pressure side of a pilot pump 43, the suction side of which is connected to the tank 41. The pilot pump 43 may be a constant delivery pump of any standard design.

The pressure line 42 also communicates with a conduit 44 leading to the casing 45 of an emergency valve, generally designated 46. Reciprocably mounted in the casing 45 is a valve member 47 for controlling the flow of fluid through conduits 44, 48, 49 and 50 leading into the casing 45. The valve member 47 is adapted to be actuated through the intervention of a valve rod 51, having connected thereto one end of a tension spring 52, the other end of which is connected to a stationary point. Upward movement of the valve rod 51 is adapted to be obtained by energization of the solenoid B.

The control system according to the invention includes a further valve, generally designated 53, comprising a casing 54 in which is reciprocably mounted a valve member 55. The valve member 55 controls the flow of fluid through conduits 56, 57, 58 and 42 leading into the interior of the casing 54. The conduit 56 is adapted to be connected with the line 42 by a pressure relief valve 110, which establishes this connection in order to prevent undue pressure from building up in the conduit 42.

The valve member 55 is actuated through the intervention of a valve rod 59 and the solenoid C, and has one end connected to a tension spring 60. The other end of this tension spring is connected to a stationary point.

The conduit 39 leading into the valve casing 40 is connected to a port 61 of a cylinder-piston arrangement 62. This cylinder-piston arrangement comprises a casing 63 and a casing 64, connected to each other in any convenient manner. The casing 63 has a bore 65 and a smaller bore 66. Reciprocably mounted in the bore 66 and adapted to extend into the bore 65, is a plunger 67 which has connected thereto a flange 68 of larger diameter than the plunger 67. When the plunger 67 is in its left hand end position, it engages a plug 69, closing the left end of the cylinder 63.

The casing 64 comprises three bores 70, 71 and 72, of which the bores 71 and 72 are separate from each other by an annular chamber 73, which chamber is connected through the port 74 with the conduit 58. The bore 70 is connected through a port 75 with the conduit 50, while the bore 71 is connected through a port 76 with the conduit 42.

Reciprocably mounted in the bore 71 is a plunger 77 having connected thereto a flange 78 of larger diameter than the diameter of the plunger 77. Reciprocably mounted in the bore 72 is a plunger 79 having connected thereto a rod 80 passing through a bore 81 and pivotally connected to a link 82 which, in its turn, is adapted to shift about a pivot 83, and is furthermore pivotally connected to one end of a link 84, the other end of which is linked to the bellcrank lever 13. Leakage around the rod 80 is prevented by packing material 85 compressed by a nut 86.

Figure 6:
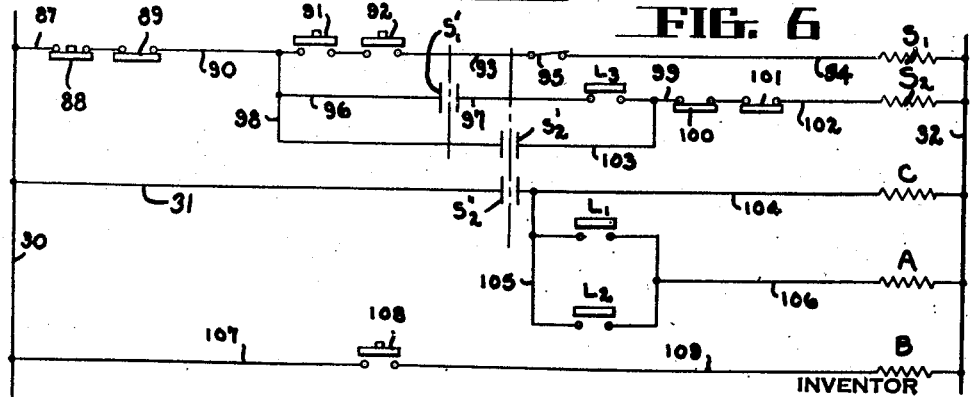
Figure 6 is a wiring diagram for use in connection with the system of Figure 1.

Referring to Figure 6 showing the wiring diagram for the arrangement of Figure 1, it will be noted that the main supply line 30 has connected thereto a line 87 which is adapted electrically to communicate through the closed reversal switch 88 and closed oil temperature switch 89 with the line 90. The line 90 is adapted to be connected, by closure of the forward or starter switches 91 and 92, with a line 93 which in its turn may be connected with the line 94 by closure of the selector switch 95. When the selector switch 95 is closed, the press circuit is conditioned for automatic operation, whereas opening of the switch 95 prepares the press for hand operation.

The line 94 comprises a contactor S1 and leads to the main supply line 32. Energization of the contactor S1 closes a normally open switch S' which, when closed, interconnects the lines 96 and 97. The line 96 leads to a line 98 connected to the line 90. The line 97 is adapted, by closure of the limit switch L3, to be connected with the line 99, which latter communicates, through the closed tonnage control switch 100 and the closed position reversal switch 101, with the line 102, which latter comprises a contactor S2 and leads to the main supply line 32. The limit switch L3 is closed when the press platen 3 approaches its retracting position, and is automatically opened when the press platen leaves this position.

Energization of the contactor S2 causes closure of the normally open switch S'2 and the normally open switch S''2. Closure of the switch S'2 connects the line 98 with the line 103, which latter is electrically connected to the line 99. Closure of the switch S''2 establishes electric connection between the line 31 and the line 104, which latter comprises the solenoid C and leads to the main supply line 32.

Branching off from the line 104 is a line 105 adapted, either by closure of the limit switch L1 or by closure of the limit switch L2, to be connected with the line 106. The line 106 comprises the solenoid A and is connected to the main supply line 32. Also connected to the main supply line 30 is a line 107 adapted, by closure of the emergency switch 108, to be connected with the line 109 comprising the solenoid B and leading to the main supply line 32.

Operation

It may be assumed that all parts of the arrangement shown in Figure 1 occupy the position shown therein, and that it is now desired to start automatic operation of the press. To this end, the operator starts the pump 5 and closes the selector switch 95. Furthermore, the operator closes the forward or starter switches 91 and 92. Closure of these switches establishes an energizing circuit for the contactor $S_1$, which energizing circuit comprises main supply line 30, closed switches 89, 88, 91, 92, 95, contactor $S_1$ and main supply line 32. Energization of the contactor $S_1$ causes the switch $S'_1$ to close. Inasmuch as in the retracted position of the ram 2, the platen 3 has closed the limit switch $L_3$, closure of the switch $S'_1$ establishes an energizing circuit for the contactor $S_2$, which circuit comprises the main supply line 30, switches 88, 89, $S'_1$, $L_3$, 100 and 101, contactor $S_2$ and main supply line 32. Energization of the contactor $S_2$ causes closure of the $S'_2$ and $S''_2$.

Closure of the switch $S'_2$ establishes a bypass circuit for the limit switch $L_3$ switch, as previously mentioned, opens after the press platen 3 has left the position shown in Figure 1. In this way, the contactor $S_2$ will remain energized, while the switch $L_3$ is open. Closure of the switch $S''_2$ establishes an energizing circuit for the solenoid C, which circuit comprises main supply line 30, line 31, switch $S''_2$, line 104, solenoid C and main supply line 32. Energization of the solenoid C causes upward movement of the valve rod 59 and thereby valve member 55 against the thrust of the spring 60. As a result thereof, fluid connection is established between the conduits 57 and 58, so that the chamber 73 in the casing 64 is connected with the tank 41.

Figure 2:
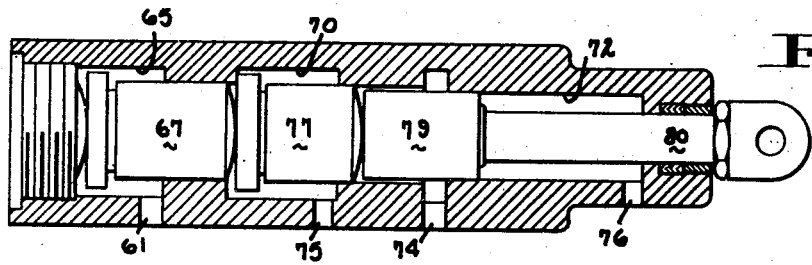
Figures 2, 3, 4 and 5 illustrate various phases of operation of the control system according to the invention.

Since, on the other hand, pressure fluid from the pump 43 is conveyed through conduit 42 to the right hand end of the bore 72, the plunger 79 is shifted toward the left into the position shown in Figure 2. As a result thereof, the control rod 8, pertaining to the servomotor 7, is shifted toward the left through the linkage 82, 84, 13, 12 and 10, thereby bringing about movement of the pump 5 into full stroke advancing position. Presure fluid from the pump 5 therefore flows through conduit 4 into the upper portion of the press cylinder 1, while fluid is withdrawn from the lower portion of the cylinder 1 through the conduit 6. The ram 2 with the platen 3, therefore, move downwardly by gravity, causing a suction effect in the upper portion of the press cylinder, which suction effect holds the surge valve 24 open so as to allow fluid from the tank 20 to pass therethrough into the upper portion of the press cylinder 1. While the platen 3 thus moves downwardly, the limit switch $L_3$ opens. This, however, has no effect on the energization of the contactor $S_2$, since the switch $L_3$ is by-passed by the line 98, the closed switch $S'_2$ and the line 103.

Figure 3:
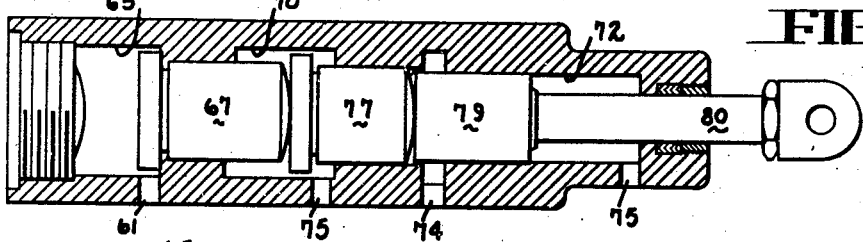
Figure 4:
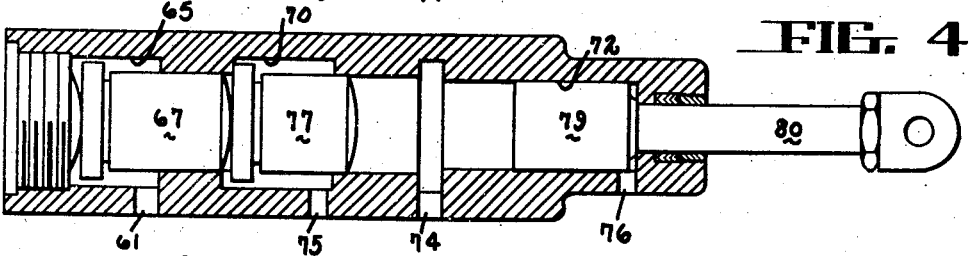
Figure 5:
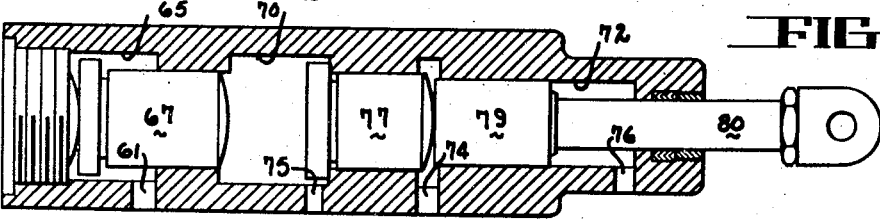

When the platen 3 approaches a predetermined position at which, under normal circumstances, the work piece is engaged, it is desired temporarily to slow down the speed of the ram 2. This is accomplished by engagement of the cam 29 with the limit switch $L_1$. When this engagement is effected, the limit switch $L_1$ closes, thereby establishing an energizing circuit for the solenoid A, which circuit comprises main supply line 30, line 31, closed switches $S''_2$, $L_1$, line 106, solenoid A and main supply line 32. Energization of the solenoid A causes the valve rod 33 and thereby the valve member 35 to move upwardly so as to establish fluid connection between the conduits 38 and 39. Pressure fluid from the pump 43 will then pass through the conduit 38 and conduit 39 past the left side of the flange 68 and, acting upon the latter, moves the plunger 67 toward the right into Figure 3 position. When the flange 68 abuts the shoulder 111 of the bore 65, the plunger 67 comes to a halt. At this time, the plunger 67, through the intervention of the plunger 77, has shifted the plunger 79 and, thereby, the linkage 82, 84, 13, 12 and 10 to such an extent that the control rod 8 brings about movement of the pump 5 into a restricted delivery position.

The movement of the plunger 79 against the pressure prevailing in the right hand end of the bore is effected by the flange 68, since the latter has a larger effective area than the effective area acted upon by the pressure fluid in the bore 72. The pump 5 now delivers less fluid to and withdraws less fluid from the cylinder 1, thereby slowing down the movement of the ram 2 which cannot move faster than fluid is withdrawn from the lower portion of the cylinder 1. The ram 2 now begins to encounter resistance offered by the work piece to be shaped and, as a result thereof, the suction effect in the upper portion of the cylinder 1 is eliminated, and the surge valve 24 closes.

When the cam 29, during the further downward movement of the platen 3, disengages the limit switch $L_1$, the latter again opens, thereby deenergizing the solenoid A. The spring 34 then returns the valve member 35 to its lower position, thereby breaking the fluid connection between the conduits 38 and 39, while establishing fluid connection between the conduit 39 and the exhaust line 36. Inasmuch as pressure still prevails in conduit 42 and the right hand end of the bore 72, the plunger 79 is again shifted toward the left, thereby also shifting the plungers 77 and 67 toward the left. The plungers 79, 77 and 67 then again occupy the position shown in Figure 2, so that the pump 5 is again in full stroke forward position. The ram 2 now starts its actual pressing stroke at full speed.

Shortly before the press ram 2 reaches the end of its pressing stroke, the cam 29 engages the limit switch $L_2$, thereby closing the energizing circuit for the solenoid A in a manner similar to that described above in connection with the closure of the limit switch $L_1$. This results in a rightward movement of the plunger 67, as likewise explained above, so that the pump delivery is reduced and the advancing movement of the ram is slowed down.

When the ram has reached the end of its retraction stroke, at which time a predetermined pressure has built up in the upper portion of the press cylinder 1, this pressure is conveyed through conduits 4 and 112 to the tonnage control valve 113, thereby causing the tonnage control switch 100 to open. This breaks the energizing circuit for the contactor $S_2$ so that the switches $S'_2$ and $S''_2$ open. When, soon afterwards, the tonnage control switch 100 again closes, the contactor $S_2$ is not re-energized, since the switch $L_3$ is open.

Opening of the switch $S''_2$ breaks the energizing circuit for the solenoid C, so that the spring 60 shifts the valve member 55 to its lowermost position. As a result thereof, fluid connection between the conduits 57 and 58 is broken, while fluid connection is established between the conduits 42 and 58. Consequently, fluid pressure from the pilot pump 43 now passes through conduits 42 and 58 into the chamber 73 where it acts upon the plunger 79 and shifts the latter toward the right. Fluid expelled from the bore 72 during this rightward movement is conveyed through the conduit 58 to the chamber 73.

The rightward movement of the plunger 79 causes the linkage 82, 84, 13, 12 and 10 to move the control rod 8 toward the right, thereby causing the servomotor 7 to push the pump 5 into full delivery retraction stroke position. Pressure fluid is now delivered by the pump 5 through conduit 6 into the lower part of the press cylinder 1, while fluid is withdrawn from the upper part of the press cylinder 1 through conduit 4. However, inasmuch as the cylinder space above the ram 2 is filled with fluid, the surge valve 24 cannot open instantly when the reversal of the pump 5 is effected. However, the pressure in the lower portion of the press cylinder 1 is now conveyed through conduits 19, 22 and 23 to the main cylinder relief and pump by-pass valve 25 and actuates the latter so as to release fluid from the upper portion of the cylinder through conduit 27 and an exhaust associated with the valve 25. As a result thereof, the surge valve 24 is opened by pressure conveyed through conduits 19 and 22, thereby establishing fluid connection between the upper portion of the press cylinder 1 and the tank 20. The fluid pressure delivered by the pump 5 to the lower portion of the press cylinder 1 now causes upward movement of the ram 2. When, during this upward movement of the ram 2, the cam 29 actuates the switches $L_2$ and $L_1$, this has no effect on the retraction stroke. When the ram 2 approaches the end of its retraction stroke, the platen 3 closes the limit switch $L_3$ in preparation for a new cycle. At the same time the platen arm 18 has lifted the push rod 16 to such an extent that the lever 13 moves into the position shown in Figure 1, in which position it causes the control rod 8 to occupy a position corresponding to the neutral or no delivery position of the pump 5. Since now no fluid is delivered to nor withdrawn from the cylinder 1, the press ram 2 comes to a halt.

If it should occur that, during the working stroke, an emergency arises and it is desired to instantaneously stop the ram 2, the operator closes the emergency switch 108, thereby closing the energizing circuit for the solenoid B. Energization of the solenoid B causes the valve member 47 to shift upwardly, thereby establishing fluid connection between the conduits 44 and 50. Fluid pressure from the pilot pump 43 is now conveyed through conduits 42, 44 and 50 past the flange 78 and moves the plunger 77 toward the right. It will be recalled that, during the working stroke of the ram 2, the plunger 79 is in its left hand position while pressure prevails in the bore 72.

Due to the pressure now acting on the flange 78, and due to the fact that the flange 78 has a greater effective area than the plunger 79, the plunger 77, while moving rightwardly, also moves the plunger 79 toward the right.

The length of the bore 70 is so dimensioned that when the flange 78 abuts the shoulder 114 of the bore 70, the linkage 82, 84, 13, 12 and 10 has shifted the pump control rod 8 and thereby the pump 5 into position for no delivery. Since now no fluid is withdrawn from nor delivered to the cylinder 1, the ram 2 comes to a halt.

If it should happen that, during the working stroke, the work piece breaks, so that the ram 2 moves beyond the normal end of the working stroke, the position reversal switch 101 is opened by the cam 29, thereby breaking the energizing circuit for the contactor $S_2$, so that the switches $S'_2$ and $S''_2$ open. This breaks the energizing circuit for the solenoid C so that the valve member 55 moves into its lower position and, in a manner described above, establishes fluid connection between the conduits 42 and 58. The plunger 79 is then moved to its right hand end position, while the linkage 82, 84, 13, 12 and 10 shifts the control rod 8 into a position corresponding to the full retraction position of the pump 5. This starts a retraction stroke of the ram 2, as has been described above.

As will be clear from the above, the shifting movement of the control rod 8 pertaining to the servomotor 7 is effected positively in both directions and the control rod 8 is also held positively in its shifted position. This structure, therefore, makes it possible to completely eliminate the spring which heretofore was customarily provided in the servomotor 7 for shifting the pump on retraction stroke. However, if the spring is retained in the servomotor 7, this will not affect the operation of the cylinder-piston arrangement 62. On the other hand, if the spring is retained in the servomotor 7, it is possible to modify the hydraulic circuit as indicated in dot-dash lines in Figure 1.

In the arrangement indicated in dot-dash lines, the various parts corresponding to parts shown in full lines in Figure 1, have the same reference numerals as the latter, however, with the additional letter $a$.

The operation of the device will still be the same as before, the only difference being that, instead of shifting the plunger 79 hydraulically to its right hand position for placing the pump into full retraction stroke position, this will now be effected by the spring in the servomotor 7.

It will be understood that I desired to comprehend within my invention such modifications as come within the scope of the claims.

Having thus fully described my invention, what I claim as new and desire to secure by Letters Patent is:

1. In combination with a reversible variable delivery pump and a servomotor therefor, a reciprocable member for actuating said servomotor, and means for actuating said reciprocable member comprising, a reciprocable first plunger having two oppositely effective differential areas and being operable by hydraulic pressure to move said reciprocable member selectively into full stroke position in one or the opposite direction, a reciprocable hydraulically operable second plunger operable to move said reciprocable member into a restricted stroke position against hydraulic pressure acting on said first plunger, a source of hydraulic pressure continuously hydraulically connected with the smaller area of the differential areas of said first plunger, and means for selectively establishing hydraulic connection between said fluid source and said second plunger to actuate the latter.

2. In combination with a reversible variable delivery pump and a servomotor therefor, a reciprocable member for actuating said servomotor, and means for actuating said reciprocable member comprising, a reciprocable first plunger having two oppositely effective differential areas and being operable by hydraulic pressure to move said reciprocable member selectively into full stroke position in one or the opposite direction, a reciprocable hydraulically operable second plunger operable to move said reciprocable member into a restricted stroke position against hydraulic pressure acting on said first plunger, a source of hydraulic pressure continuously hydraulically connected with the smaller area of the differential areas of said first plunger, means for selectively establishing hydraulic connection between said fluid source and said second plunger to actuate the latter, a third hydraulically operable plunger operable to move said reciprocable member into an intermediate or neutral position against fluid pressure acting upon said first plunger, and means for selectively establishing hydraulic connection between said fluid source and said third plunger to operate the latter.

WALTER ERNST.

REFERENCES CITED

The following references are of record in the file of this patent:

UNITED STATES PATENTS

| Number    | Name     | Date           |
|-----------|----------|----------------|
| 2,234,009 | Robinson | Mar. 4, 1941   |
| 2,239,862 | Davis    | Apr. 29, 1941  |
| 2,260,175 | Ernst    | Oct. 21, 1941  |
| 2,274,226 | Wiedmann | Feb. 24, 1942  |
| 2,283,168 | Ernst    | May 19, 1942   |
| 2,298,359 | Ernst    | Oct. 13, 1942  |